US008550804B2

(12) United States Patent
Mies et al.

(10) Patent No.: US 8,550,804 B2
(45) Date of Patent: Oct. 8, 2013

(54) ROTARY PRESS, PARTICULARLY FOR THE MANUFACTURE OF TABLETS

(75) Inventors: Stephan Mies, Berlin (DE); Michael Matthes, Berlin (DE); Jürgen Böhnlein, Berlin (DE); Walter Hegel, Berlin (DE); Helmut Zeddies, Berlin (DE); Wolfgang Korsch, Berlin (DE)

(73) Assignee: Korsch AG, Berlin (DE)

( * ) Notice: Subject to any disclaimer, the term of this patent is extended or adjusted under 35 U.S.C. 154(b) by 0 days.

(21) Appl. No.: 13/318,784

(22) PCT Filed: May 6, 2010

(86) PCT No.: PCT/EP2010/002792

§ 371 (c)(1), (2), (4) Date: Nov. 4, 2011

(87) PCT Pub. No.: WO2010/127861

PCT Pub. Date: Nov. 11, 2010

(65) Prior Publication Data

US 2012/0058215 A1 Mar. 8, 2012

(30) Foreign Application Priority Data

May 7, 2009 (DE) ........................ 10 2009 020 196

(51) Int. Cl.
*B29C 43/08* (2006.01)

(52) U.S. Cl.
USPC .......................................................... 425/345

(58) Field of Classification Search
USPC .......................................... 425/193, 344–345
See application file for complete search history.

(56) References Cited

U.S. PATENT DOCUMENTS

| | | | | |
|---|---|---|---|---|
| 839,156 | A | 6/1906 | Kliewer | |
| 3,891,375 | A | 6/1975 | Pilewski | |
| 3,924,996 | A | 12/1975 | Semenovich | |
| 5,032,071 | A * | 7/1991 | Bliss et al. | 425/345 |
| 6,116,889 | A | 9/2000 | Pagel | |
| 7,942,662 | B2 | 5/2011 | Roemer | |
| 8,025,498 | B2 | 9/2011 | Haase | |

FOREIGN PATENT DOCUMENTS

| | | |
|---|---|---|
| DE | 23 57 809 | 5/1975 |
| DE | 197 05 094 | 7/1998 |
| SU | 1 821 397 | 6/1993 |

* cited by examiner

*Primary Examiner* — Richard Crispino
*Assistant Examiner* — Thukhanh Nguyen
(74) *Attorney, Agent, or Firm* — Paul Vincent

(57) ABSTRACT

A rotary press, particularly for manufacturing tablets, has a rotarily driven rotor and at least one pressure roller unit which is detachably secured to a bearing device, particularly at least one bearing plate, by means of a retaining device. Provision is made here for a plurality of similar retaining devices to be arranged on the bearing device, wherein the pressure roller unit can optionally be secured to one of the retaining devices and/or transferred between them.

16 Claims, 2 Drawing Sheets

ROTARY PRESS, PARTICULARLY FOR THE MANUFACTURE OF TABLETS

This application is the national stage of PCT/EP2010/002792 filed on May 6, 2010 and also claims Paris Convention priority of DE 10 2009 020 196.3 filed May 7, 2009.

BACKGROUND OF THE INVENTION

The invention relates to a rotary pressure, particularly for the manufacture of tablets, with a driven rotor and at least one pressure roller unit which is detachably secured to a bearing device by means of a retaining device.

A generic rotary press, such as that disclosed in DE 197 05 094 C1, for example, has a rotarily driven rotor which rotates in an essentially horizontal plane and supports a multiplicity of die pairs, each of which consists of an upper die and a lower die, which are adjustable relative to each other. At a predetermined point on the circumference of the rotor the material to be processed and the material to be pressed into a tablet are poured by means of a filling device into the intermediate space between the upper die and the lower die. When the die pair thus filled is moved by the rotation of the rotor in its circumferential direction, the two dies are moved towards each other by control cams and are then fed to at least one pressure roller unit lying upstream in the circumferential direction of the rotor, in which unit they are pressed against each other with pressure, as a result of which the material is compressed to form the tablet. The dies then enter an extraction station lying upstream in the circumferential direction of the rotor, in which station the dies move apart and the tablet is extracted and discharged.

The method process shown relates to the manufacture of the tablet from a uniform material, i.e. a so-called 1-layer tablet. As a variant of the procedure, additional pre-pressing of the material may be provided, for which purpose a further pressure roller unit is then used which is arranged between the filling device and said pressure roller unit.

A pressure roller unit may have either a pair of pressure rollers or even an individual pressure roller.

If a multi-layer tablet is to be manufactured from two or more different materials, a $1^{st}$ material is first poured into the intermediate space between the dies by means of a $1^{st}$ filling device, whereupon this $1^{st}$ material is pre-compressed by means of a $1^{st}$ pressure roller unit. A $2^{nd}$ material is then poured into the remaining intermediate space between the dies by means of a $2^{nd}$ filling unit, then compressed by means of a $2^{nd}$ pressure roller unit. If necessary further layers from the same and other materials may also be provided. All the materials are compressed to form the tablet, which is then extracted. In this case a multiplicity of work stations, namely at least two filling devices, at least two pressure roller units and the extraction station are therefore arranged distributed around the circumference of the rotor.

A further, essentially different configuration of the work station is required for manufacturing a so-called core-coated tablet, where a prefabricated core of a $1^{st}$ material is coated in a lower and upper layer of a $2^{nd}$ material. In all cases pre-pressing of the material may also be provided and different filling devices are used, according to the nature and quantity of the material to be processed.

In order to adapt the rotary pressure to the type of tablet required by the user (for example single-layer tablet, bi-layer tablet, tri-layer tablet, core-coated tablet, either with or without pre-pressing), and also to the type of material to be processed, the user must align and install the individual work stations in a certain mutual arrangement relative to the rotor, for which purpose an expensive conversion of the rotary press is required, resulting in long down times of the rotary press.

The objective of the invention is to provide a rotary pressure of the type mentioned whose conversion for adaptation to a different type of tablet production is facilitated.

SUMMARY OF THE INVENTION

This object is achieved according to the invention by a rotary press with the features described in the independent claim. Here provision is made for a plurality of similar retaining devices to be arranged on the bearing device to which the pressure roller unit is detachably secured, wherein the pressure roller unit is optionally secured to one of the retaining devices and/or can be transferred between different retaining devices. The pre-assembled retaining devices, which are preferably arranged distributed along the circumference of the rotor, enable the user to select, for fitting the pressure roller unit, exactly the retaining device that is assigned to the desired position of the pressure roller unit relative to the rotor. In order to bring a pressure roller unit from a $1^{st}$ position into another circumferential position of the rotor, the user need only loosen the retaining device that has hitherto engaged with the pressure roller unit, and displace or transfer the pressure roller unit to the new position so that it engages with the retaining device already in that position, thereby securing it. The displacement of the pressure roller unit may in this case take place on predetermined guides, or even on a cushion of air, thus simplifying the transfer movement. However, transfer of the pressure roller unit with a lifting device is also conceivable.

Furthermore, it is possible in the case of the rotary press according to the invention to arrange additional pressure roller units, such as those required, for example, when pre-pressing the material or in the case of a multi-layer tablet, in the desired manner in suitable circumferential regions of the rotor, since a plurality of pre-assembled retaining devices are already available to the user from which he need only select the suitable retaining device and bring it into engagement with the corresponding pressure roller unit.

A flexible, easily convertible rotary pressure for manufacturing tablets is thereby provided according to the invention.

In a preferred design of the invention provision is made for the bearing device to comprise at least one bearing plate, wherein the retaining devices are preferably arranged on the side of the bearing plate facing away from the pressure roller unit and penetrate them. The bearing plate or plates may be arranged underneath and/or above the pressure roller unit or pressure roller units.

The retaining device may be a screw device which is screwed with the pressure roller unit, but alternatively it is also possible to clamp or lock the pressure roller unit hydraulically or pneumatically, for example, with the retaining device, thereby providing a quick change retaining device which enables the pressure roller unit to be fitted and released quickly.

Since a pressure roller unit is normally relatively heavy, thereby making difficult manual transfer of the pressure roller unit, the pressure roller unit is normally displaced on a bearing device or bearing plate. To prevent the retaining devices from obstructing this displacement provision can be made, in a development of the invention, for the retaining devices to be brought into a non-use position in which they are incorporated in the bearing device so that the retaining device does not project from the side of the bearing device on which the pressure roller unit is arranged and displaced. In this case provision should be made for the retaining device in the non-use position, to form a stepless surface with the surface of the bearing device or bearing plate, thereby on the one hand simplifying the displacement of the pressure roller unit and on the other hand preventing material dust from accumulating in recesses, which is undesirable for health reasons.

According to the configuration of the rotary press, one or a plurality of filling devices are arranged in the circumferential region of the rotor. Each filling device requires at least one drive to be able to introduce the material to be pressed into the intermediate space between the upper die and lower die. According to the invention the rotary press has a plurality of pre-assembled drive devices of a similar type, wherein the filling device can be optionally coupled to one of the drive devices by at least one transmission element.

The transmission element may, for example, be a belt, a flexible shaft or a cardan shaft. This design enables the user to position the filling device at the desired suitable point in the circumferential region of the rotor, then connect it to one, normally the nearest drive device via the transmission element. In this case provision can be made for the drive devices to be arranged on the bearing device or bearing plate. It has been proved particularly advantageous to arrange the drive devices distributed along the circumference of the rotor, so that a suitable drive device lies in the proximity of each position of the filling device.

If the bearing device is formed from at least one bearing plate, the drive devices may each have a drive shaft projecting from the bearing plate and pivoted in it, which shaft is either connected to its own drive or is suitably driven by a central drive. It has proved particularly advantageous to provide a plurality and, in particular, two to three drive shafts with a common drive motor whose drive movement is normally transmitted by a belt or a gear, for example a gear drive, to the individual drive shafts.

In a preferred design of the invention provision is made for the drive devices to be brought into a non-use position in which they are received or countersunk in the bearing device or bearing plate or plates. The advantage of this is that the drive devices in the non-use position do not project from the bearing device or bearing plate and does not therefore obstruct the transfer movement of the pressure roller unit.

In a development of the invention provision can be made for the drive devices in the non-use position to seal flush against the outside of the bearing device or bearing plate or plates, so that cavities in which material dust can accumulate are avoided.

In a rotary press of a structure of prior art cam carriers are normally arranged above and/or below the rotor to receive at least one control cam for controlling the relative movement between the upper die and the lower die of a die pair and their movement relative to the rotor during its rotation. According to the configuration of the rotary press, and according to the desired purpose of use, the control cams must also be suitably adapted. In a development of the invention provision can therefore be made for the cam carrier to be composed of a plurality of interchangeably mounted cam carrier segments, so that the user is able to assemble the cam carrier suitable for the intended application individually from corresponding segments. Since only individual sections of the control cam or cam carrier can be changed during the conversion of the rotary press, if necessary, rapid, simple conversion can be achieved by replacing individual cam carrier segments.

The cam carrier segments are preferably arranged on the bearing device or bearing plate and are either screwed to it or are connected to it by a quick change clamping device.

To guarantee proper operation of the rotary press, the rotor should be aligned exactly horizontal. By converting the rotary press, and in particular by displacing the relatively heavy pressure roller unit on the bearing device or bearing plate, loads are redistributed, which may result in an inclined position of the bearing device or bearing plate, particularly if it is supported by elastically flexible bearings. In a development of the invention a levelling device may be provided by means of which the bearing device or bearing plate is retained in a desired alignment, and in particular in horizontal alignment. The levelling device preferably consists of a recording device which monitors and records the deviation of the bearing device or bearing plate from the desired alignment, and of a preferably pneumatic or hydraulic adjusting device by means of which the bearing device or bearing plate can be returned to the desired alignment.

BRIEF DESCRIPTION OF THE DRAWING

Further details and features of the invention may be deduced from the following description of an exemplary embodiment with reference to the drawing, in which.

DESCRIPTION OF THE PREFERRED EMBODIMENT

Figure 1:
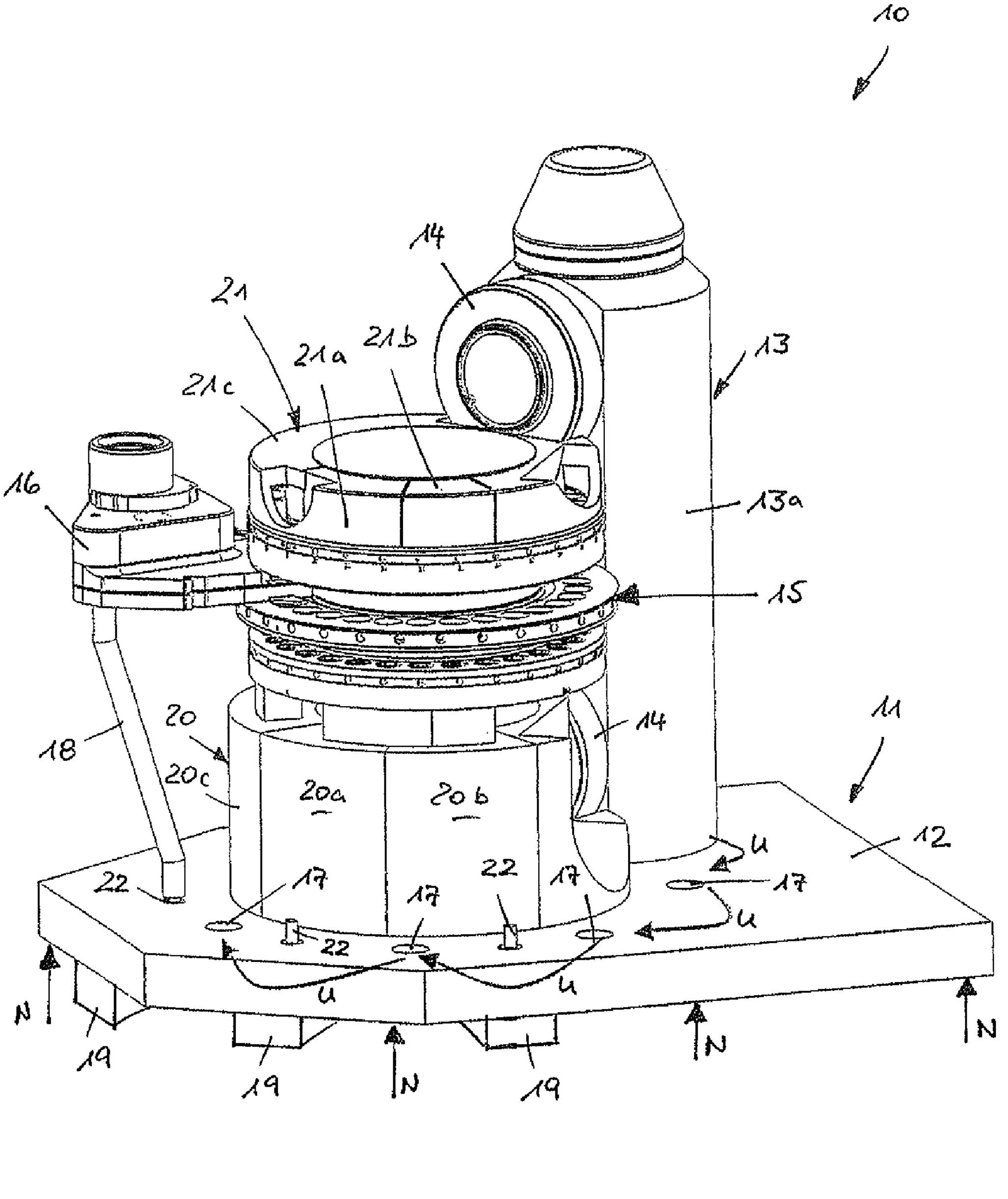
FIG. 1 shows a diagrammatic perspective view of a rotary press according to the invention.

A rotary press 10 according to FIG. 1 is used to manufacture tablets, and has a bearing device 11 in the form of a horizontally aligned lower bearing plate 12. A rotor 15, represented only diagrammatically, is rotarily driven, in a manner not shown, and has a multiplicity of drilled holes distributed along the circumference, in which holes, in the normal manner, not shown, an upper die and a lower die are displaceably received. An upper cam carrier 21, which carries a control cam for the upper die and is composed of cam carrier segments 21*a*, 21*b* and 21*c*, is arranged above rotor 15 on the side facing away from bearing plate 12. A lower cam carrier 20 is mounted underneath rotor 15 on bearing plate 12, which carrier carries a control cam for the lower die and is composed of a plurality of cam carrier segments 20*a*, 20*b* and 20*c*. Cam carrier segments 20*a*, 20*b*, 20*c* and 21*a*, 21*b* and 21*c* can be dismantled and replaced independently of each other in order to be able to adapt the lower and upper cam carrier 20, 21 to the desired configuration of rotary press 10.

A pressure roller unit 13 has a pair of pressure rollers 15, which is mounted by means of a support column 13*a* on the upper side of bearing plate 12 and is secured, and in particular clamped there by means of a retaining device 17.

As FIG. 1 shows, a plurality of similar retaining devices 17 are formed in bearing plate 12, which devices are arranged distributed along the circumference of rotor 15. Support column 13*a* of pressure roller unit 13 can be fitted on each of these retaining devices 17 in a similar manner so that the user has a multiplicity of possible applications for pressure roller unit 13 without having to provide special mountings or bearings.

Figure 2:
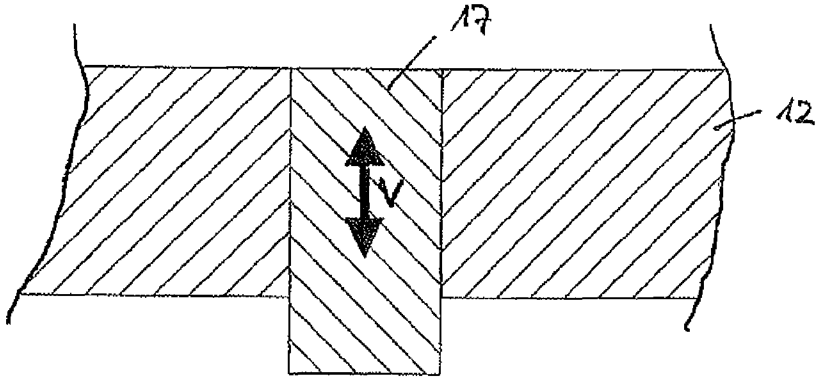
FIG. 2 shows a diagrammatic section through the lower bearing plate with a countersunk retaining device.

FIG. 2 shows an only diagrammatic representation of a retaining device 17 in bearing plate 12. AS indicated by arrow V, retaining device 17 can be adjusted perpendicularly to the plate plane of bearing plate 12 between a position of use projecting from the upper side of bearing plate 12, in which the retaining device 17 can engage with support column 13*a*, and a non-use position which is shown in FIG. 2 and in which the retaining device 17 is inserted fully into bearing plate 12, so that retaining device 17 forms a smooth, stepless surface with the upper side of bearing plate 12. This enables the relatively heavy support column 13*a* to be displaced or transferred on the upper side of bearing plate 12 between the different retaining devices 17, as indicated by arrow U in FIG. 1.

Figure 3:
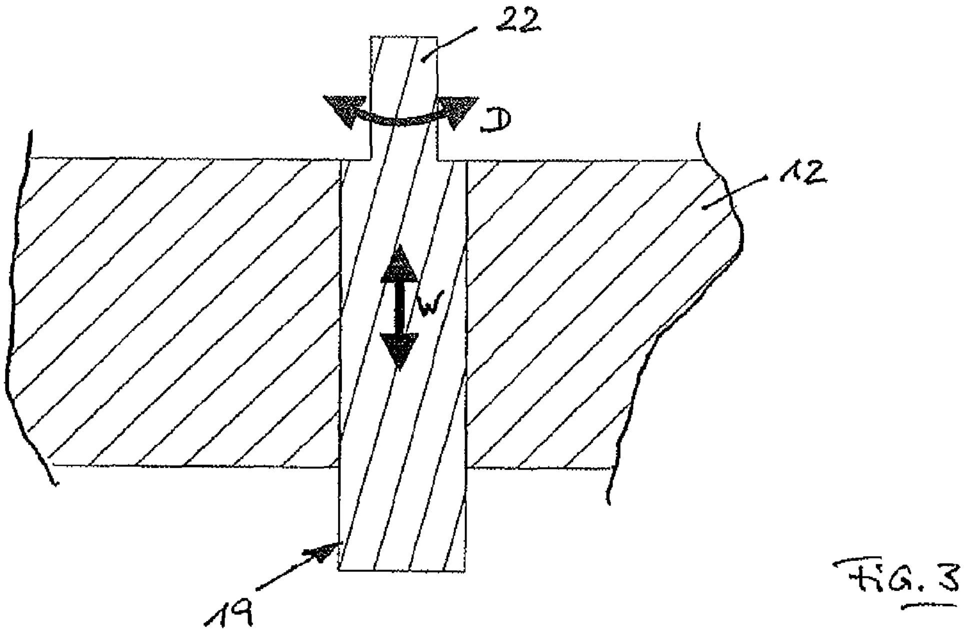
FIG. 3 shows a diagrammatic section through the lower bearing plate with a drive device for the filling device.

Furthermore, a filling device 16, by means of which the material to be pressed can be introduced into the intermediate space between the upper die and lower stamp in the normal manner, is assigned to rotor 15. Filling device 16 requires a drive which in the case of the rotary press according to the invention is integrated in bearing plate 12, or is arranged underneath it. As FIG. 3 shows, bearing plate 12 is penetrated by a drive shaft 22 which is rotarily driven in a manner not shown (see arrow W), so that in a position of use it projects from the upper side of bearing plate 12, as shown in FIG. 3, and can be pulled into bearing plate 12 in a non-use position.

As FIG. 1 shows, a plurality of drive devices 19 are provided on bearing plate 12, the drive shafts 22 of which, projecting upwards from bearing plate 12 in the direction of rotor 15, are distributed along the circumference of rotor 15. To drive filling device 16, a user is able to couple filling device 16 via a transmission element 18, in the form of a cardan shaft, for example, to one of drive shafts 22 so that when repositioning filing device 16 simple, fast connection to a suitable, already pre-assembled drive device 19 is possible.

Arrows N in FIG. 1 indicate a levelling device by means of which bearing plate 12 is retained in horizontal alignment. This is necessary if the bearing plate is supported by elastically flexible bearings and the distribution of loads on bearing plate 12 is changed by converting the rotary press.

We claim:

1. A rotary press or a rotary press for manufacturing tablets, the rotary press comprising:

a driven rotor;

at least one pressure roller unit having a pair of pressure rollers;

a bearing device; and a plurality of similar retaining devices cooperating with said pressure roller unit and said bearing device to detachably secure said pressure roller unit to said bearing device, wherein said pressure roller unit is structured for secure cooperation with one of said retaining devices and/or said pressure roller unit is structured for transfer among said retaining devices, at least one of said retaining devices being structured for displacement into a non-use position in which that retaining device is received In said bearing device.

2. The rotary press of claim 1, wherein said bearing device comprises at least one bearing plate.

3. The rotary press of claim 1, wherein at least one of said retaining devices comprises a clamping device.

4. The rotary press of claim 1, wherein said retaining devices are distributed along a circumference of said rotor.

5. The rotary press of claim 1, wherein, in said non-use position, said retaining device forms a smooth, stepless surface with a side of said bearing device facing said rotor.

6. The rotary press of claim 1, further comprising at least one filling device disposed in a circumferential region of said rotor, a plurality of similar drive devices and a transmission element cooperating with one said filling device and one of said drive devices to optionally couple said filling device to said drive device.

7. The rotary press of claim 6, wherein said drive devices are disposed on said bearing device.

8. The rotary pressure of claim 6, wherein said drive devices are distributed along a circumference of said rotor.

9. The rotary pressure of claim 7, wherein said drive devices are distributed along a circumference of said rotor.

10. The rotary press of claim 6, wherein said transmission element is a belt, a flexible shaft or a cardan shaft.

11. The rotary press of claim 6, wherein said drive devices are structured for displacement into a non-use position in which those drive devices are received in said bearing device.

12. The rotary press of claim 11, wherein, in said non-use position, the drive devices are flush with a side of said bearing device facing said rotor.

13. The rotary press of claim 1, further comprising a cam carrier disposed above and/or below said rotor to receive at least one control cam, wherein said cam carrier comprises a plurality of exchangeably mounted cam carrier segments.

14. The rotary press of claim 13, wherein said cam carrier segments are disposed on said bearing device.

15. The rotary press of claim 1, further comprising a levelling device by means of which said bearing device can be retained in a desired alignment.

16. The rotary press of claim 15, wherein said the levelling device retains an upper side of said bearing device in horizontal alignment.

* * * * *